US010011764B2

(12) United States Patent
Bhamidipati et al.

(10) Patent No.: US 10,011,764 B2
(45) Date of Patent: Jul. 3, 2018

(54) POROUS CEMENT COMPOSITION FOR PROPPING FRACTURES OPEN

(71) Applicant: HALLIBURTON ENERGY SERVICES, INC., Houston, TX (US)

(72) Inventors: Venkata Satya Srikalyan Bhamidipati, Port Gentil (GA); Denise N. Benoit, Houston, TX (US); Jimmie D. Weaver, Duncan, OK (US); Philip D. Nguyen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/621,179

(22) Filed: Feb. 12, 2015

(65) Prior Publication Data
US 2016/0237341 A1    Aug. 18, 2016

(51) Int. Cl.
| | | |
|---|---|---|
| *E21B 43/267* | (2006.01) | |
| *C09K 8/80* | (2006.01) | |
| *C04B 28/04* | (2006.01) | |
| *C09K 8/467* | (2006.01) | |
| *C09K 8/473* | (2006.01) | |
| *C04B 103/00* | (2006.01) | |
| *C04B 103/42* | (2006.01) | |

(52) U.S. Cl.
CPC .............. *C09K 8/80* (2013.01); *C04B 28/04* (2013.01); *C09K 8/467* (2013.01); *C09K 8/473* (2013.01); *E21B 43/267* (2013.01); *C04B 2103/0071* (2013.01); *C04B 2103/42* (2013.01)

(58) Field of Classification Search
CPC ............................. E21B 43/267; C09K 8/80
See application file for complete search history.

(56) References Cited

U.S. PATENT DOCUMENTS

| | | | | |
|---|---|---|---|---|
| 5,252,525 A | * | 10/1993 | Gonzales ........... | B01D 39/2075 501/124 |
| 6,323,307 B1 | * | 11/2001 | Bigg ....................... | C08L 57/00 524/306 |
| 6,554,071 B1 | | 4/2003 | Reddy et al. | |
| 6,715,553 B2 | | 4/2004 | Reddy et al. | |
| 6,763,888 B1 | * | 7/2004 | Harris ...................... | C09K 8/52 166/300 |
| 6,858,566 B1 | * | 2/2005 | Reddy .................... | C04B 38/02 106/672 |
| 6,992,048 B2 | | 1/2006 | Reddy et al. | |
| 7,044,224 B2 | * | 5/2006 | Nguyen ................ | C09K 8/665 106/600 |
| 7,073,584 B2 | * | 7/2006 | Reddy .................... | C04B 28/02 166/293 |

(Continued)

FOREIGN PATENT DOCUMENTS

WO    WO 2013019188 A1    2/2013

*Primary Examiner* — Zakiya W Bates
*Assistant Examiner* — Crystal J Miller
(74) *Attorney, Agent, or Firm* — McGuireWoods LLP (57) ABSTRACT

A method of fracturing a subterranean formation comprising: introducing a fracturing fluid into the subterranean formation to create or enhance one or more fractures in the subterranean formation; introducing a cement composition into the one or more fractures, wherein the cement composition comprises: (A) cement; (B) water; and (C) an additive; and allowing the cement composition to set, wherein the additive creates a plurality of pores within the set cement.

8 Claims, 3 Drawing Sheets

(56) References Cited

U.S. PATENT DOCUMENTS

| | | | | |
|---|---|---|---|---|
| 7,172,022 B2* | 2/2007 | Reddy | C04B 28/02 | 106/677 |
| 7,288,147 B2* | 10/2007 | Christensen | C04B 28/02 | 106/672 |
| 7,581,590 B2* | 9/2009 | Lesko | C09K 8/665 | 166/280.1 |
| 7,677,312 B2* | 3/2010 | Boney | C04B 28/02 | 166/280.1 |
| 7,806,183 B2* | 10/2010 | Roddy | C04B 20/008 | 106/717 |
| 8,490,700 B2* | 7/2013 | Lesko | C09K 8/665 | 166/280.1 |
| 2004/0094300 A1* | 5/2004 | Sullivan | C09K 8/52 | 166/308.1 |
| 2004/0261999 A1* | 12/2004 | Nguyen | C09K 8/665 | 166/292 |
| 2005/0205258 A1* | 9/2005 | Reddy | C04B 28/02 | 166/292 |
| 2005/0274285 A1* | 12/2005 | Christensen | C04B 28/02 | 106/672 |
| 2007/0100029 A1* | 5/2007 | Reddy | C04B 28/02 | 524/5 |
| 2008/0135242 A1* | 6/2008 | Lesko | C09K 8/665 | 166/268 |
| 2009/0032252 A1* | 2/2009 | Boney | C04B 28/02 | 166/280.2 |
| 2009/0065198 A1* | 3/2009 | Suarez-Rivera | E21B 43/305 | 166/250.1 |
| 2010/0096135 A1* | 4/2010 | Roddy | C04B 20/008 | 166/293 |
| 2010/0126723 A1* | 5/2010 | Ali | C09K 8/508 | 166/281 |
| 2012/0129737 A1* | 5/2012 | Lesko | C09K 8/665 | 507/211 |
| 2013/0192834 A1* | 8/2013 | Schneider | E21B 36/003 | 166/302 |
| 2013/0333891 A1* | 12/2013 | Fripp | E21B 29/02 | 166/302 |
| 2014/0131042 A1* | 5/2014 | Nguyen | C09K 8/80 | 166/280.2 |
| 2014/0144629 A1* | 5/2014 | Nguyen | E21B 43/267 | 166/280.1 |
| 2014/0144639 A1* | 5/2014 | Nguyen | C09K 8/57 | 166/300 |

* cited by examiner

POROUS CEMENT COMPOSITION FOR PROPPING FRACTURES OPEN

TECHNICAL FIELD

Hydraulic fracturing operations can be used to stimulate production of a reservoir fluid. A cement composition can be placed within the fractures to keep the fractures from closing. The cement composition can be designed to have a desired permeability after the cement has set. The reservoir fluid can then be produced through the fractures and the permeable cement.

BRIEF DESCRIPTION OF THE FIGURES

The features and advantages of certain embodiments will be more readily appreciated when considered in conjunction with the accompanying figures. The figures are not to be construed as limiting any of the preferred embodiments.

DETAILED DESCRIPTION OF THE INVENTION

Oil and gas hydrocarbons are naturally occurring in some subterranean formations. In the oil and gas industry, a subterranean formation containing oil or gas is referred to as a reservoir. A reservoir may be located under land or off shore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir. The oil, gas, or water produced from the wellbore is called a reservoir fluid.

As used herein, a "fluid" is a substance having a continuous phase that tends to flow and to conform to the outline of its container when the substance is tested at a temperature of 71° F. (22° C.) and a pressure of 1 atmosphere "atm" (0.1 megapascals "MPa"). A fluid can be a liquid or gas. A homogenous fluid has only one phase; whereas a heterogeneous fluid has more than one distinct phase. A heterogeneous fluid can be: a slurry, which includes an external liquid phase and undissolved solid particles as the internal phase; an emulsion, which includes an external liquid phase and at least one internal phase of immiscible liquid droplets; a foam, which includes an external liquid phase and a gas as the internal phase; or a mist, which includes an external gas phase and liquid droplets as the internal phase.

A well can include, without limitation, an oil, gas, or water production well, an injection well, or a geothermal well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered the region within approximately 100 feet radially of the wellbore. As used herein, "into a well" means and includes into any portion of the well, including into the wellbore or into the near-wellbore region via the wellbore. As used herein, "into a subterranean formation" means and includes into any portion of a subterranean formation including, into a well, wellbore, or the near-wellbore region via the wellbore.

A portion of a wellbore may be an open hole or cased hole. In an open-hole wellbore portion, a tubing string may be placed into the wellbore. The tubing string allows fluids to be introduced into or flowed from a remote portion of the wellbore. In a cased-hole wellbore portion, a casing is placed into the wellbore that can also contain a tubing string. A wellbore can contain an annulus. Examples of an annulus include, but are not limited to: the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

After a wellbore is drilled, it may often be necessary to fracture the subterranean formation to enhance hydrocarbon production. A fracturing fluid, often called a pad fluid, is pumped using a frac pump at a sufficiently high flow rate and high pressure into the wellbore and into the subterranean formation to create or enhance a fracture in the subterranean formation. Creating a fracture means making a new fracture in the formation. Enhancing a fracture means enlarging a pre-existing fracture in the formation. As used herein, the term "fracture" means the creation or enhancement of a natural fracture using a fracturing fluid, and can be referred to as "man-made." To fracture a subterranean formation typically requires hundreds of thousands of gallons of fracturing fluid. Further, it is often desirable to fracture at more than one downhole location. Therefore, the base fluid of a fracturing fluid is usually water or water-based for various reasons, including the ready availability of water and the relatively low cost of water compared to other liquids.

The newly-created or enhanced fracture will tend to close together after pumping of the fracturing fluid has stopped due to the weight of the subterranean formation. To prevent the fracture from closing, a material must be placed in the fracture to keep the fracture propped open. Generally, proppant is used to prop the fractures open. The proppant is in the form of solid particles, which can be suspended in the fracturing fluid, carried down hole, and deposited in the fracture as a "proppant pack." The proppant pack generally props the fracture in an open position while allowing fluid flow through the permeability of the pack.

However, the solid-liquid, multi-phase nature of a fracturing fluid containing proppant poses additional concerns and requires additional skills to properly perform the job. Consequently, hydraulic fracturing operations are some of the most complex operations performed in the Oil and Gas industry. Therefore, there exists a need and an ongoing industry-wide concern for improved fluids that can be used to prevent fractures from closing.

It has been discovered that a cement composition can be introduced into fractures to keep the fractures open. The cement composition can include one or more ingredients that degrade or generate a gas to create voids within the cement composition after setting.

As used herein, a "cement composition" is a mixture of at least cement and water that develops compressive strength or sets. A cement composition is generally a slurry in which the water is the external phase of the slurry and the cement (and any other insoluble particles) is the internal phase. The external phase of a cement composition can include dissolved solids. As used herein, the word "cement" means a binder, which is a dry substance that develops compressive strength and can set and can bind other materials together when mixed with water.

It is desirable for a cement composition to have certain properties, such as a desired rheology, thickening time, and compressive strength.

If any laboratory test (e.g., compressive strength) requires the step of mixing, then the cement composition is mixed according to the following procedure. The water is added to a mixing container and the container is then placed on a mixer base. The motor of the base is then turned on and maintained at 4,000 revolutions per minute "rpm" (+/−200 rpm). The cement and any other ingredients are added to the container. The ingredients and cement can be added at different times during the mixing. After all the ingredients have been added to the water in the container, a cover is then placed on the container, and the cement composition is mixed at 4,000 rpm (+/−200 rpm) for 1 min.

It is also to be understood that if any laboratory test requires the test be performed at a specified temperature and possibly a specified pressure, then the temperature and pressure of the cement composition is ramped up to the specified temperature and pressure after being mixed at ambient temperature and pressure. For example, the cement composition can be mixed at 71° F. (22° C.) and 1 atm (0.1 MPa) and then placed into the testing apparatus and the temperature of the cement composition can be ramped up to the specified temperature. As used herein, the rate of ramping up the temperature is in the range of about 3° F./min to about 5° F./min (about 1.67° C./min to about 2.78° C./min). The purpose of the specific rate of temperature ramping during measurement is to simulate the temperature profile experienced by the cement composition as it is being pumped downhole. After the cement composition is ramped up to the specified temperature and possibly specified pressure, the cement composition is maintained at that temperature and pressure for the duration of the testing.

A cement composition can be acid soluble. As used herein, the acid solubility of a cement composition is tested as follows. The cement composition is mixed. The cement composition was placed into a 2 cubic inch curing mould until the cement composition was set. The set cement cube was then removed from the mould and weighed to obtain the "initial" weight. The cement cube was then immersed in a stated acid solution at a specified temperature, which could simulate the bottomhole temperature of a well. The cement cube was removed from the acid solution at a variety of times and weighed to obtain a "final" weight at that time. The percent solubility was calculated according to the following equation:

$$\% \text{ acid solubility} = \frac{\text{initial} - \text{final}}{\text{initial}} * 100\%$$

As used herein, a cement composition having a percent acid solubility of greater than at least 10% in 15 minutes is "acid soluble."

It is necessary for a cement composition to remain pumpable during introduction into the well and until the cement composition is situated in the portion of the well to be cemented. After the cement composition has reached the portion of the well to be cemented, the cement composition ultimately sets. A cement composition that thickens too quickly while being pumped can damage pumping equipment or block tubing or pipes, and a cement composition that sets too slowly can cost time and money while waiting for the composition to set.

As used herein, the "thickening time" is how long it takes for a cement composition to become unpumpable at a specified temperature and pressure. The pumpability of a cement composition is related to the consistency of the cement composition. The consistency of a cement composition is measured in Bearden units of consistency (Bc), a dimensionless unit with no direct conversion factor to the more common units of viscosity. As used herein, a cement composition becomes "unpumpable" when the consistency of the substance reaches 70 Bc. As used herein, the consistency of a cement composition is measured according to ANSI/API 10B-2 section 9, Recommended Practice for Testing Well Cements, Second Edition, April 2013 as follows. The cement composition is mixed. The cement composition is then placed in the test cell of a High-Temperature, High-Pressure (HTHP) consistometer, such as a FANN® Model 275 or a Chandler Model 8240, at a specified temperature and pressure. Consistency measurements are taken continuously until the cement composition exceeds 70 Bc.

A cement composition can develop compressive strength. Cement composition compressive strengths can vary from 0 psi to over 10,000 psi (0 to over 69 MPa). Compressive strength is generally measured at a specified time after the cement composition has been mixed and at a specified temperature and pressure. Compressive strength can be measured, for example, at a time of 24 hours. According to ANSI/API 10B-2, Recommended Practice for Testing Well Cements, compressive strength can be measured by either a destructive method or non-destructive method and reported in units of pressure, such as psi or MPa.

The compressive strength of a cement composition can be used to indicate whether the cement composition has initially set or set. As used herein, a cement composition is considered "initially set" when the cement composition develops a compressive strength of 50 psi (0.3 MPa) using the non-destructive compressive strength method at a specified temperature and pressure. As used herein, the "initial setting time" is the difference in time between when the dry ingredients are added to the water and when the cement composition is initially set.

As used herein, the term "set," and all grammatical variations thereof, are intended to mean the process of becoming hard or solid by curing. As used herein, the "setting time" is the difference in time between when the dry ingredients are added to the water and when the cement composition has set at a specified temperature. It can take up to 48 hours or longer for a cement composition to set.

According to certain embodiments, a method of fracturing a subterranean formation comprises: introducing a fracturing fluid into the subterranean formation to create or enhance one or more fractures in the subterranean formation; introducing a cement composition into the one or more fractures, wherein the cement composition comprises: (A) cement; (B) water; and (C) an additive; and allowing the cement composition to set, wherein the additive creates a plurality of pores within the set cement.

It is to be understood that the discussion of preferred embodiments regarding the cement composition or any ingredient in the cement composition, is intended to apply to all of the method embodiments. Any reference to the unit "gallons" means U.S. gallons.

Figure 1:
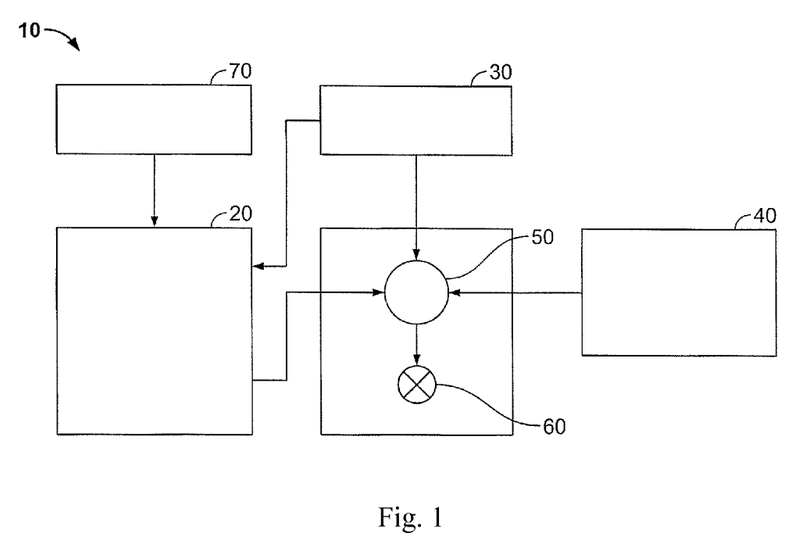
FIG. 1 is a diagram illustrating a fracturing system according to certain embodiments.

The fracturing system 10 of FIG. 1 can include a fracturing fluid producing apparatus 20, a fluid source 30, an additive source 40, and a pump and blender system 50 and resides at the surface at a well site where a well 60 is located. In certain embodiments, the fracturing fluid producing apparatus 20 combines a gel precursor with fluid (e.g., liquid or substantially liquid) from fluid source 30, to produce a hydrated fracturing fluid that is used to fracture the formation. The hydrated fracturing fluid can be a fluid for ready use in a fracture stimulation treatment of the well 60 or a concentrate to which additional fluid is added prior to use in a fracture stimulation of the well 60. In other instances, the fracturing fluid producing apparatus 20 can be omitted and the fracturing fluid sourced directly from the fluid source 30.

The additive source 40 can include solid additives for combining with the fracturing fluid. The system may also include an additional additive source 70 to alter the properties of the fracturing fluid. According to certain embodiments, the fracturing fluid does not include proppant.

The pump and blender system 50 can receive the fracturing fluid and combine it with other components, including additives from the additive sources 40 and/or 70. The resulting mixture may be pumped down the well 60 under a pressure sufficient to create or enhance one or more fractures in a subterranean zone, for example, to stimulate production of fluids from the zone. The fracturing fluid producing apparatus 20, fluid source 30, and/or additive source 40/70 can each be equipped with one or more metering devices (not shown) to control the flow of fluids, additives, and/or other compositions to the pumping and blender system 50. Such metering devices can facilitate the pumping. The blender system 50 can source from one, some, or all of the different sources at a given time, and can facilitate the preparation of fracturing fluids using continuous mixing or "on-the-fly" methods. Thus, for example, the pumping and blender system 50 can provide just fracturing fluid into the well at some times, just proppant at other times, and combinations of those components at yet other times.

Figure 2:
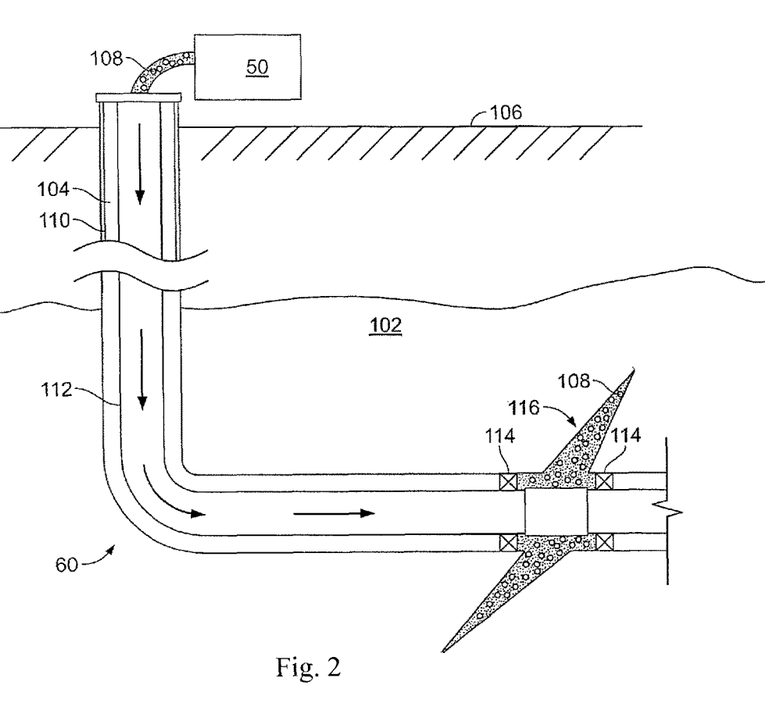
FIG. 2 is a diagram illustrating a well system in which a fracturing operation can be performed.

The fracturing fluid can be pumped into the subterranean formation. FIG. 2 shows the well 60 during a fracturing operation in a portion of a subterranean formation 102. The subterranean formation can be penetrated by a well. The well can be, without limitation, an oil, gas, or water production well, an injection well, or a geothermal well. The well can also be an offshore well. The well includes a wellbore 104. The wellbore 104 extends from the surface 106, and the fracturing fluid 108 is introduced into a portion of the subterranean formation 102. The wellbore 104 can include a casing 110 that is cemented or otherwise secured to the wellbore wall. The wellbore 104 can be uncased or include uncased sections. Perforations can be formed in the casing 110 to allow fracturing fluids and/or other materials to flow into the subterranean formation 102. In cased wells, perforations can be formed using shaped charges, a perforating gun, hydro-jetting and/or other tools.

The well is shown with a work string 112. The pump and blender system 50 can be coupled to the work string 112 to pump the fracturing fluid 108 into the wellbore 104. The work string 112 can include coiled tubing, jointed pipe, and/or other structures that allow fluid to flow into the wellbore 104. The work string 112 can include flow control devices, bypass valves, ports, and or other tools or well devices that control a flow of fluid from the interior of the work string 112 into the subterranean formation 102. For example, the work string 112 can include ports (not shown) located adjacent to the wellbore wall to communicate the fracturing fluid 108 directly into the subterranean formation 102, and/or the work string 112 can include ports that are spaced apart from the wellbore wall to communicate the fracturing fluid 108 into an annulus that is located between the outside of the work string 112 and the wall of the wellbore.

The well system can include one or more sets of packers 114 that create one or more wellbore intervals. The methods also include introducing the fracturing fluid into the subterranean formation to create or enhance one or more fractures in the subterranean formation 102. When the fracturing fluid 108 is introduced into wellbore 104 (e.g., in FIG. 2, the wellbore interval located between the packers 114) at a sufficient hydraulic pressure, one or more fractures 116 may be created in the subterranean formation 102.

The methods include introducing a cement composition into the one or more fractures. The cement composition includes cement. The cement can be Class A cement, Class C cement, Class G cement, Class H cement, and any combination thereof. The cement can be, without limitation, Portland cement, Gypsum cement, Joppa cement, Dyckerhoff cement, Slag cement, high aluminate cements, such as calcium-aluminate cements, calcium magnesia cements, and any combination thereof. According to certain embodiments, the cement is a thixotropic cement. Thixotropy is a time-dependent shear thinning property of a substance. A thixotropic substance will be viscous under static conditions, but will become less viscous over time when shaken, agitated, or otherwise stressed. The thixotropic substance will then take a fixed amount of time to return to its more viscous state after the stress is removed. Therefore, a thixotropic fluid is a fluid which takes a finite amount of time to attain equilibrium viscosity when introduced to a step change in shear rate. A commercially-available example of a thixotropic cement is SENTINELCEM™ cement, marketed by Halliburton Energy Services, Inc.

The cement composition includes water. The water can be selected from the group consisting of freshwater, brackish water, seawater, and saltwater, in any combination thereof in any proportion. The water can also include a water-soluble salt. The salt can be selected from the group consisting of sodium chloride, calcium chloride, calcium bromide, potassium chloride, potassium bromide, magnesium chloride, and any combination thereof in any proportion. The salt can be in a concentration in the range of about 0.1% to about 40% by weight of the water.

The cement composition also includes an additive. The methods also include allowing the cement composition to set. The cement composition can set within the one or more fractures. The set cement can keep the fractures from closing under the pressure from the subterranean formation.

The additive creates a plurality of pores within the set cement. According to certain embodiments, a percentage of the pores are interconnected thereby providing a desired amount of permeability to the set cement composition. In this manner, fluid can flow through the interconnected pores of the set cement and flow into or from the subterranean formation. The desired amount of permeability can be predetermined based on the desired rate of fluid flow through the set cement composition and can be in the range of 10 to 200 darcies.

The additive can be a delayed acid release compound, a gas-generating compound, or a compound that undergoes a phase transformation.

The additive can also be any substance that undergoes a phase transition at the bottomhole temperature of the wellbore. As used herein, a "phase transition" means any change that occurs to the physical properties of the substance. As used herein, a "phase transition" can include, without limitation, a change in the phase of the substance (i.e., from a solid to a liquid or semi-liquid, from a liquid or semi-liquid to a gas, etc.), a glass transition, a change in the amount of crystallinity of the substance, physical changes to the amorphous and/or crystalline portions of the substance, and any combinations thereof. A substance will undergo a phase transition at a "phase transition temperature." As used herein, a "phase transition temperature" includes a single temperature and a range of temperatures at which the substance undergoes a phase transition. Therefore, it is not necessary to continually specify that the phase transition temperature can be a single temperature or a range of temperatures throughout. By way of example, a substance will have a glass transition temperature or range of temperatures, symbolized as $T_g$. The $T_g$ of a substance is generally lower than its melting temperature $T_m$. The glass transition can occur in the amorphous regions of the substance.

The glass transition, also called the glass-liquid transition, is a reversible transition in one or more regions of a substance from a hard solid into a molten or rubber-like state at the glass transition temperature (TO. Crystallinity refers to the degree of structural order in a solid. A substance can include both amorphous portions or regions and crystalline portions or regions. In these instances, the crystallinity usually means the percentage of the volume of the substance that is crystalline. The crystalline portions of a substance contain atoms or molecules that are arranged in a regular, periodic manner.

The substance that undergoes the phase transition can be a wax, thermoplastic, sugar, salt, eutectic composition, or a hypo- or hyper-eutectic composition. According to this embodiment, the additive does not undergo the phase transition until the cement composition has set. According to this embodiment, the methods can further include decreasing the temperature of at least a portion of the wellbore prior to introduction of the cement composition. The decrease in temperature can be performed prior to introducing the cement composition into the one or more fractures. The step of decreasing can include introducing a cooling fluid into the one or more fractures. The cooling fluid can be a variety of types of fluids used in oil or gas operations, for example, drilling fluids, injection fluids, fracturing fluids, work-over fluids, acidizing fluids, gravel packing fluids, completion fluids, and stimulation fluids. According to this embodiment, the cooling fluid being introduced into the wellbore has a surface temperature that is less than the phase transition temperature of the substance. By way of example, fracturing fluids can cool the bottomhole temperature of the portion of the wellbore by over 100° F. (38° C.). By way of another example, the fracturing fluids can cool the bottomhole temperature to within 10° F. (−12° C.) of the surface temperature of the injected fluid. As used herein, the term "bottomhole" means the portion of the wellbore or subterranean formation in which the cement composition is introduced. The bottomhole temperature can be decreased to a temperature that is less than or equal to the phase transition temperature of the substance, glass-transition temperature and/or the solid/liquid phase transition temperature of the substance. In this manner, the substance is initially subjected to a bottomhole temperature that is less than any of the phase transition temperatures of the substance.

According to certain embodiments, the cement composition is acid soluble. According to certain embodiments, the percentage of acid solubility of the set cement composition is at least 20%, or alternatively at least 40% at the bottomhole temperature and pressure of the subterranean formation after being contacted with an acid for 180 min. According to certain other embodiments, the percentage of acid solubility is sufficient to provide the desired permeability to the set cement composition. According to certain embodiments, a sufficient number of connective flow paths are generated to ensure communication is established between the created voids after acid solubilizing the cement to obtain the desired permeability.

For an acid-soluble cement composition, the additive can be a delayed acid release compound. For example, the additive can be an acid that is encapsulated whereby the coating delays the release of the acid until the cement composition has set, or the additive can be a compound that forms an acid downhole. By way of example, the encapsulated additive can be an inorganic or organic compound selected from the group consisting of sodium acetate trihydrate, L-tartaric acid disodium, salt dihydrate, sodium citrate dihydrate, hydrate of an inorganic acid, hydrate of an inorganic acid salt, sodium tetraborate decahydrate, sodium hydrogenphosphate heptahydrate, sodium phosphate, a borate source material selected from the group consisting of anhydrous boric oxide, anhydrous sodium borate, sodium perborate monohydrate, a sulfonate ester (e.g., a methyl methanesulfonate ester), a phosphate ester, an orthoformate, an orthoacetate, a citric acid ester, and any combination thereof. Moreover, according to certain embodiments, the delayed-release acid itself may be used as a delayed acidizing reactant, which may react with a delayed acidizing corresponding salt in order to form the delayed-release acid.

Specific sulfonate esters can include, but are not limited to, a methyl p-toluenesulfonate; an ethyl p-toluenesulfonate; a methyl o-toluenesulfonate; an ethyl o-toluenesulfonate; a methyl m-toluenesulfonate; an ethyl m-toluenesulfonate; a methyl methanesulfonate; an ethyl methanesulfonate); any derivative thereof; and any combination thereof. Suitable phosphate esters can include alone or in combination mono, di-, and tri-phosphate esters. Specific phosphate esters can include, but are not limited to, methyl phosphate; dimethyl phosphate; trimethyl phosphate; ethyl phosphate; diethyl phosphate; triethyl phosphate; butyl phosphate; dibutyl phosphate; tributyl phosphate; 2-ethylhexyl phosphate; 2-diethylhexyl phosphate; tri(2-ethylhexyl)phosphate; butoxyethyl phosphate; dibutoxyethyl phosphate; tributoxyethyl phosphate; phenyl phosphate; diphenyl phosphate; triphenyl phosphate; cresyl phosphate; dicresyl phosphate; tricredyl phosphate; xylenyl phosphate; dixylenyl phosphate; trixylenyl phosphate; isopropylphenyl phosphate; bis(isopropylphenyl)phosphate; tris(isopropylphenyl)phosphate; (phenylphenyl)phosphate; bis(phenylphenyl)phosphate; tris(phenylphenyl)phosphate; naphthyl phosphate; dinaphthyl phosphate; trinaphthyl phosphate; cresyldiphenyl phosphate; xylenyl diphenyl phosphate; diphenyl(2-ethylhexyl) phosphate; di(isopropylphenyl)phenylphosphate; monoisodecyl phosphate; 2-acryloyloxyethyl acid phosphate; 2-methacryloyloxyethyl acid phosphate; diphenyl-2-acryloyloxyethyl phosphate; diphenyl-2-methacryloyloxyethyl phosphate; melamine phosphate; dimelamine phosphate; poly(oxy-1,2-ethanediyl); alpha-tridecyl-omega-hydroxy phosphate; melamine pyrophosphate; any derivative thereof; and any combination thereof. Examples of suitable orthoformates can include, but are not limited to, trimethyl orthoformate; triethyl orthoformate; tripropyl orthoformate; triisopropyl orthoformate; tributyl orthoformate; a poly(orthoformate); any derivative thereof; and any combination thereof. Suitable orthoacetates can include, but are not limited to, trimethyl orthoacetate; triethyl orthoacetate;

tripropyl orthoacetate; triisopropyl orthoacetate; tributyl orthoacetate; a poly(orthoacetate); any derivative thereof; and any combination thereof. Specific citric acid esters include, but are not limited to, a triethyl citrate; an acetyl triethyl citrate; a tributyl citrate; an acetyl tributyl citrate; any derivative thereof; and any combination thereof.

By way of another example, the additive can be an acid precursor. The acid precursor can form an acid via hydrolysis. An example of an acid precursor is a carboxylate that forms a carboxylic acid in the presence of the water. The carboxylic acid can be, without limitation, formic acid, acetic acid, lactic acid, oxalic acid, or citric acid. The type of carboxylic acid formed will depend on the carboxylate selected. For example, if a formate is selected, then the carboxylic acid will be formic acid—if a citrate is selected, then the carboxylic acid will be citric acid, and so on. The formation of the acid is preferably delayed until the cement composition has set. Accordingly, the acid precursor can also be encapsulated to delay the formation of the acid until the desired amount of time. The release or formation of the acid can then cause the plurality of pores within the acid-soluble set cement.

The additive can also be a gas-generating compound. Examples of gas-generating compounds that can be used include, but are not limited to, chemicals containing hydrazine or azo groups such as hydrazine, azodicarbonamide, azobis(isobutyronitrile), p-toluene sulfonyl hydrazide, p-toluene sulfonyl semicarbazide, carbohydrazide, p,p'-oxybis(benzenesulfonyl hydrazide) and mixtures thereof. Other examples of nitrogen generating chemicals include, but are not limited to, ammonium salts of organic or inorganic acids, hydroxylamine sulfate, carbamide and mixtures thereof. According to this embodiment, the gas is generated during the setting of the cement composition. In this manner, the gas creates the plurality of pores during the setting of the cement composition. The amount of gas produced can be in the range of about 40% to about 60% by volume of the cement composition. The amount of gas produced can determine the amount of porosity of the set cement composition. Preferably, the amount of gas produced creates the desired amount of porosity and permeability to the set cement composition.

The gas-generating compound can be included in the cement composition along with an activator for activating the gas-generating compound. The activator can be for example, a base or buffer for raising the pH of the water to the alkaline range of from about 10 to about 14 or one or more oxidizing agents to generate gas. The activator can be selected from alkali metal hydroxides, alkaline earth metal hydroxides, or alkaline metal salts, potassium phosphate, potassium monohydrogenphosphate, sodium carbonate, sodium bicarbonate, alkaline and alkaline earth metal salts of peroxide, persulfate, perborate, chlorite, chlorate, iodate, bromate, chloroaurate, arsenate, antimonite, ammonium persulfate, sodium persulfate, potassium persulfate, sodium chlorite, sodium chlorate, hydrogen peroxide, sodium perborate, and sodium peroxy carbonate.

The concentration of the additive can be selected to provide the desired amount of porosity and permeability. According to certain embodiments, the additive is in a concentration of about 5% to about 60% by weight of the cement (bwoc). The additive can be mixed throughout the cement composition. In this manner, the additive is predominately uniformly distributed throughout the cement composition. This uniform distribution can help the set cement composition achieve the desired permeability due to the pores being interconnected.

The cement composition can have a density in the range of about 9 to about 12 ppg (about 1.1 to about 1.4 kg/L). The cement composition can have a thickening time in the range of about 5 to about 15 hours, alternatively of about 10 to about 12 hours, at the bottomhole temperature and pressure of the subterranean formation. The set cement composition can have a compressive strength of at least 100 psi (0.7 MPa) at the bottomhole temperature and pressure of the subterranean formation. The set cement composition can also have at least a sufficient compressive strength to keep the one or more fractures propped open.

The cement composition can further include other additives. Examples of other additives include, but are not limited to, a viscosifier or suspending agent, a filler, a lost-circulation material, a fluid loss additive, a strength enhancer, a friction reducer, a light-weight additive, a defoaming agent, a high-density additive, a mechanical property enhancing additive, a filtration-control additive, a thixotropic additive, a set retarder, a set accelerator, and combinations thereof.

Figure 3:
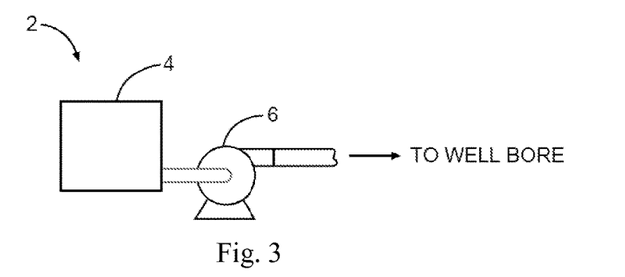
FIG. 3 illustrates a system for preparation and delivery of a cement composition to a wellbore according to certain embodiments.

FIG. 3 illustrates a system that can be used in the preparation of the cement composition and delivery to the wellbore according to certain embodiments. As shown, the cement composition can be mixed in mixing equipment 4, such as a jet mixer, re-circulating mixer, or a batch mixer, for example, and then pumped via pumping equipment 6 to the wellbore. In some embodiments, the mixing equipment 4 and the pumping equipment 6 can be located on one or more cement trucks. In some embodiments, a jet mixer can be used, for example, to continuously mix the cement composition, including water, as it is being pumped to the wellbore.

Figure 4:
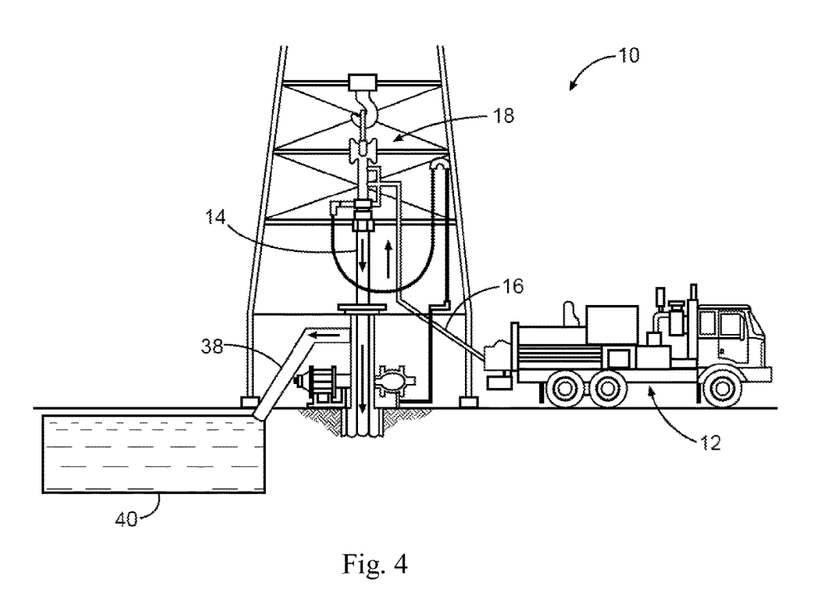
FIG. 4 illustrates surface equipment that may be used in placement of a cement composition into a wellbore.

An example technique and system for introducing the cement composition into a subterranean formation will now be described with reference to FIG. 4. FIG. 4 illustrates surface equipment 10 that can be used to introduce the cement composition. The surface equipment 10 can include a cementing unit 12, which can include one or more cement trucks, mixing equipment 4, and pumping equipment 6 (e.g., as depicted in FIG. 3). The cementing unit 12 can pump the cement composition 14 through a feed pipe 16 and to a cementing head 18, which conveys the cement composition 14 downhole.

The exemplary fluids and additives disclosed herein may directly or indirectly affect one or more components or pieces of equipment associated with the preparation, delivery, recapture, recycling, reuse, and/or disposal of the disclosed fluids and additives. For example, the disclosed fluids and additives may directly or indirectly affect one or more mixers, related mixing equipment, mud pits, storage facilities or units, fluid separators, heat exchangers, sensors, gauges, pumps, compressors, and the like used to generate, store, monitor, regulate, and/or recondition the exemplary fluids and additives. The disclosed fluids and additives may also directly or indirectly affect any transport or delivery equipment used to convey the fluids and additives to a well site or downhole such as, for example, any transport vessels, conduits, pipelines, trucks, tubulars, and/or pipes used to fluidically move the fluids and additives from one location to another, any pumps, compressors, or motors (e.g., topside or downhole) used to drive the fluids and additives into motion, any valves or related joints used to regulate the pressure or flow rate of the fluids, and any sensors (i.e., pressure and temperature), gauges, and/or combinations thereof, and the like. The disclosed fluids and additives may also directly or indirectly affect the various downhole equipment and tools that may come into contact with the fluids and additives such as, but not limited to, drill string, coiled tubing, drill pipe, drill collars, mud motors, downhole motors and/or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention.

As used herein, the words "comprise," "have," "include," and all grammatical variations thereof are each intended to have an open, non-limiting meaning that does not exclude additional elements or steps. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A method of fracturing a subterranean formation comprising:
   introducing a fracturing fluid into the subterranean formation to create or enhance one or more fractures in the subterranean formation;
   introducing a cement composition into the one or more fractures, wherein the cement composition comprises:
   (A) cement;
   (B) water; and
   (C) a pore-generative additive, wherein the pore-generating additive consists essentially of a gas-generating compound; and
   allowing the cement composition to set, wherein the gas is generated during the setting of the cement composition, wherein the pore-generating additive creates a plurality of pores within the set cement, wherein a percentage of the pores are interconnected thereby providing a desired amount of permeability to the set cement composition; wherein the amount of gas produced by the gas-generating compound is in the range of 40% to 60% by volume of the cement composition; wherein the gas-generating compound is in a concentration of about 5% to about 60% by weight of the cement.

2. The method according to claim 1, wherein the cement is selected from the group consisting of Class A cement, Class C cement, Class G cement, Class H cement, and any combination thereof.

3. The method according to claim 1, wherein the cement is a thixotropic cement.

4. The method according to claim 1, wherein the cement is selected from the group consisting of Portland cement, Gypsum cement, Joppa cement, Dyckerhoff cement, Slag cement, high aluminate cements, such as calcium-aluminate cements, calcium magnesia cements, and any combination thereof.

5. The method according to claim 1, wherein the water is selected from the group consisting of freshwater, brackish water, seawater, and saltwater, in any combination thereof in any proportion.

6. The method according to claim 1, wherein the cement composition further comprises a water-soluble salt.

7. The method according to claim 1, wherein the gas-generating compound is selected from the group consisting of: compounds comprising hydrazine or azo groups, including azobis(isobutyronitrile), carbohydrazide; nitrogen generating compounds, including ammonium salts of organic or inorganic acids, hydroxylamine sulfate, carbamide; and combinations thereof.

8. The method according to claim 1, wherein the step of introducing comprises pumping the fracturing fluid into the subterranean formation using a pump.

* * * * *